July 7, 1953   J. R. GLAZEBROOK ET AL   2,644,551
BRAKE SHOE AND METHOD OF ASSEMBLING SAME
Filed July 2, 1946
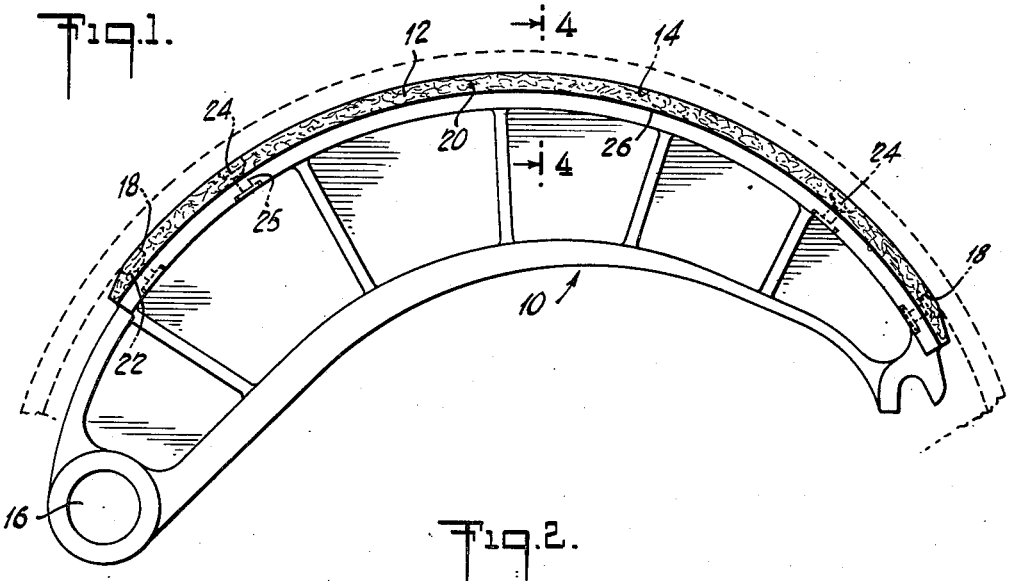
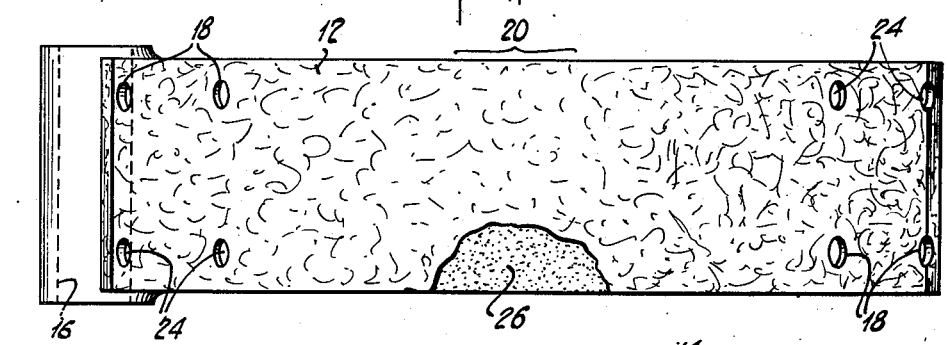
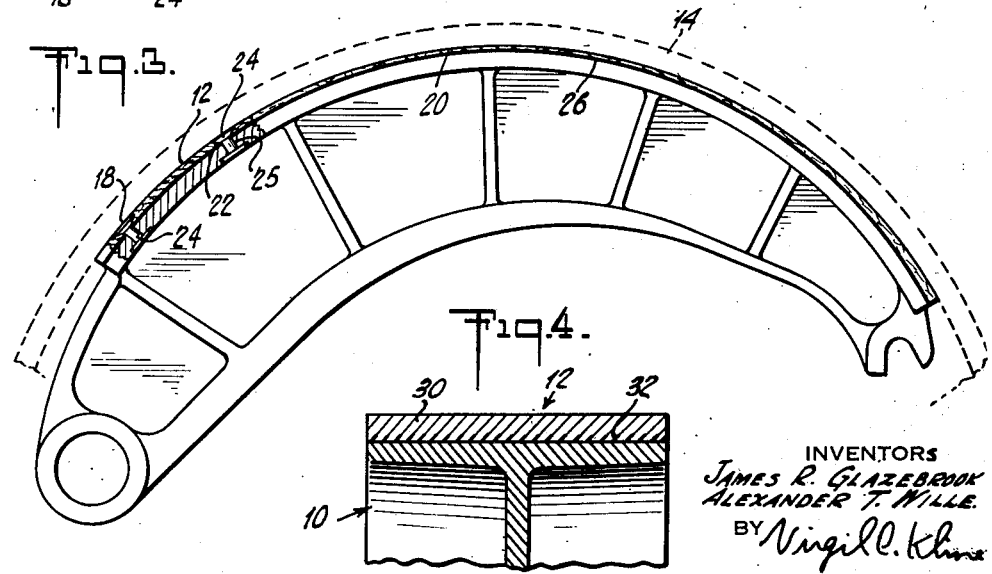
INVENTORS
James R. Glazebrook
Alexander T. Wille
BY Virgil C. Kline
ATTORNEY Patented July 7, 1953

2,644,551

UNITED STATES PATENT OFFICE 2,644,551

BRAKE SHOE AND METHOD OF ASSEMBLING SAME

James R. Glazebrook, New York, N. Y., and Alexander T. Wille, Waukegan, Ill., assignors to Johns-Manville Corporation, New York, N. Y., a corporation of New York Application July 2, 1946, Serial No. 680,986

8 Claims. (Cl. 188—234)

The instant invention relates to brake mechanisms and, more particularly, to an improved friction lining or facing and mounting therefor which will allow a greater percentage of the material of the lining to be utilized than is the case in conventional practice. Although the following description and claims refer only to brake "lining," it will be understood that this term is to be construed in a broader sense to include friction linings or facings where used for other purposes, such as in clutches and the like.

The common, internal expanding brake as used on modern automobiles, buses and trucks employs a brake shoe mounted within a brake drum, the shoe having an arcuate lining-receiving surface of a smaller radius than the braking surface of the drum, the difference in radii being equal to the thickness of the lining or brake block carried by the shoe. The lining is secured to the shoe by rivets or bolts located at spaced intervals and countersunk into the lining. Due to the construction and arrangement of the shoe, the central section of the shoe approaches the drum, as the lining wears away, at a faster rate than the remainder, and the rivet or bolt heads in this section are reached and the lining is worn out while there is still substantial thicknesses of otherwise utilizable lining material above the heads of the rivets or bolts adjacent the ends of the lining.

Attempts have heretofore been made to overcome this wastage of the lining material by redesigning the brake to use tapered linings having a maximum thickness at approximately the central section where the greatest wear occurs, and a minimum thickness at the ends. However, such constructions require a complete redesign of the brake which is undesirable, particularly with respect to the relining of existing brakes. It has also been proposed to secure linings of a conventional, uniform thickness to the shoes solely by an adhesive, thus permitting the lining to be worn down substantially to the shoe at the point of greatest wear to increase the wear capacity of the lining. This system requires special equipment for the application of the heat and/or pressure necessary to provide the strong bond between the shoe and lining needed to withstand the load applied. Such equipment is not available to the average repair shop and, hence, the commercial utility of this proposal is limited.

The principal object of the instant invention is the provision of an improved lining and mounting therefor which permits the lining to be substantially completely worn out at the location of greatest wear before it must be discarded, but which avoids the disadvantages inherent in both of the prior proposals.

Another object of the invention is the provision of an improved mounting adopted to accommodate friction linings of conventinal type and used in conjunction with conventional shoes.

A further object of the invention is the provision of a mounting employing a combination of the mechanical and adhesive lining-securing systems of the prior art.

A still further object of the invention is the provision of a mounting of the type referred to in which an adhesively secured section is automatically held against the shoe during curing or setting of the adhesive.

A still further object of the invention is the provision of a lining as described above including means to definitely indicate when the lining is worn beyond a safe lmit.

Our invention will be more fully understood and further objects and advantages thereof will become apparent when reference is made to the more detailed description of a preferred embodiment of the invention which is to follow and to the accompanying drawing in which:

Fig. 1 is a side elevational view of a lined brake shoe in accordance with the invention;

Fig. 2 is a plan view of the brake shoe of Fig. 1;

Fig. 3 is a view similar to Fig. 1 illustrating the condition of the lining when worn; and, Fig. 4 is a sectional view, on an enlarged scale, taken on the line 4—4 of Fig. 1 and illustrating one feature of the invention.

Referring now to the drawings, there is shown a shoe 10 of generally the conventional type employed in an internally expanding brake, the shoe carrying a lining 12 adapted for frictional engagement against the internal braking surface of a drum 14 indicated in dotted lines. The shoe shown for purposes of illustration is of the more conventional, fixed anchor type which swings around a pivot 16, but it will be understood that the invention is equally applicable to other brake shoe mountings. Interposed between the shoe and drum is the brake lining or block 12 of uniform thickness throughout. The mounted lining has an inner radius of curvature approximately equal to the radius of curvature of the shoe, whereby it conforms to and lies closely against the shoe throughout, and an outer radius of curvature equal to the radius of curvature of the drum. Lining 12 is preferably of relatively stiff but resilient construction and suitably is formed by a molding, sheeting, extruding or profile calendering operation. The lining may be composed of generally conventional ingredients including fibers, resinous binders, rubber and friction materials as is well known in the art.

In accordance with the invention and as distinguished from prior practice, the block 12 is provided with shouldered apertures 18 located only adjacent the ends of the block, to leave an imperforate intermediate or central section 20. The ends of the lining are secured to the shoe by headed fasteners 24, comprising bolts, rivets or the like, which extend through apertures 18 and into aligned apertures 25 in the shoe. The fasteners may be arranged in any suitable pattern in the end portions of the lining.

At least the intermediate or central section 20 is secured to the shoe by an adhesive 26, the adhesive layer preferably also extending to the ends of the lining (see Figs. 1 and 2). This adhesive may be of any suitable type which will provide a strong bond between the shoe and the lining to cooperate with the fasteners and prevent separation of the lining from the shoe under severe service conditions. A large number of known adhesives are suitable for this purpose, the adhesives having the desired qualities being particularly of the thermo-setting type which set up or cure to their ultimate strength at relatively low temperatures. Examples are styrene derivative resins and phenol-formaldehyde resins, such as "Bakelite" resins. In application the resins may be employed with a suitable thinner such as alcohol. It will be understood that the invention is not limited to any particular one of the known adhesives.

In mounting the lining on the shoe the adhesive is preferably first applied either to the shoe or to the inner surface of the lining, or to both, at least at the location intermediate the fastener apertures and preferably for the full length of the lining, and the lining then placed on the shoe. The headed fasteners are inserted in the apertures 18, with their shanks extending through the aligned apertures 25 in the shoe, and drawn down tightly to bring the heads of the fasteners against the shoulders 22, and the lining into contiguous relationship to the shoe. The action of the fasteners in maintaining contact of the lining with the shoe throughout the length of the lining, including the intermediate portion 20, enables the adhesive to effect a firm bond between the lining and shoe irrespective of the length of time required for the curing or setting action to take place. The construction thus inherently serves as a press to maintain the adhesively treated portion of the lining against the shoe and eliminates the need of the special presses and other equipment heretofore employed when adhesive bonds have been used.

In order to insure the firm contact of the intermediate portion 20 of the lining against the shoe during the setting period, the lining may be molded to have an internal radius of curvature, when unmounted, somewhat greater than the radius of curvature of the shoe. When the lining is placed in position and the ends pulled down into contact with the shoe, the central section will be pressed firmly against the shoe by the inherent resiliency of the lining, the operation closely simulating that of a conventional press.

If desired the shoe with the lining secured to it as explained above may be mounted in the drum for immediate service, the fasteners together with initial bonding action of the adhesive serving adequately to retain the lining on the shoe during the period required for the adhesive to take its final bond or set. Where an adhesive is employed which is set by heat, or where the setting action is enhanced by heat, the operation of the brake serves to bring the lining and shoe to the elevated temperatures required for such action to take place. That is, the frictional contact of the lining against the rotating drum in use will raise the temperature of the lining and shoe to, say, 250° to 300° F. which is sufficient for the purpose with adhesives of the type referred to.

Another feature of the invention resides in the inclusion of means for positively notifying the user when the band is worn beyond a safe limit, this being of particular importance in the instant construction, as complete wearing away of the band in the intermediate portion might well cause failure of the brake. For this purpose the lining is made of two layers (see particularly Fig. 4) including an outer wearing surface layer 30 and a backing layer 32 suitably integrally joined during the molding operation. Friction material compositions are ordinarily of relatively dark colors such as dark gray or brown, depending upon the particular raw materials used. However, these may be modified by the addition of pigments or dyes. In accordance with the instant feature, the composition forming either the surfacing or the backing layer has a color medium added to it to provide a definite color contrast with the other layer. Any suitable pigment or dye may be used for this purpose. The coloring material is thoroughly incorporated with the composition. If an extrusion process is used the two differently colored compositions may be separately extruded and then combined. On the other hand the two differently colored compositions may be applied successively in the sheeter process and the unitary product obtained. Inasmuch as the coloring material is distributed through the one layer, when the band is worn down to the backing layer, the contrast between the layers will make this readily apparent to the observer. The backing layer is made of the minimum thickness to which the brake band should be worn without replacement and this thickness is correlated with the depth of countersink of fasteners 24, so that the heads of the fasteners and a point on the surface of the backing layer intermediate the fasteners and opposite the place of greatest wear define an arc of substantially the same radius as the radius of the braking surface of the drum. As will be readily understood the place of greatest wear will vary somewhat depending upon the construction of the brake shoe, but in any event it will be approximately centrally of the intermediate portion of the lining.

In the use of a brake incorporating the features of the instant invention, the lining gradually wears down, the greatest wear occurring in the intermediate portion where there are no fastener heads. When the band is worn to its minimum safe thickness at such intermediate portion, such minimum preferably being indicated by the exposure of the base layer of contrasting color as illustrated in Fig. 3, the rivet heads have approximately been reached. Consequently all or substantially all of the usable portion of the lining has been expended. The invention thus eliminates much of the waste inherent in conventional brake constructions but, at the same time, neither requires redesign of the brake system, nor the use of special equipment or tools. Although the description has been directed to the use of the invention on internally expanding brakes, it will be appreciated that it may also be employed on externally contracting brakes without modification, except for the design of the band or shoe itself.

Having thus described our invention in rather full detail, it will be understood that these details need not be strictly adhered to but that various changes and modifications will suggest themselves to one skilled in the art, all falling within the scope of the invention as defined by the subjoined claims.

What we claim is:

1. A brake shoe for cooperation with a brake drum, a friction lining for said shoe covering substantially the entire arcuate length of the shoe and mounted thereon, headed fasteners located only adjacent the ends of the lining and countersunk therein securing said lining to said shoe adjacent the ends thereof, and adhesive means fixedly securing the portion of the lining to said shoe intermediate the ends of the lining.

2. A brake shoe for cooperation with a brake drum, said shoe having a curved surface of a radius of curvature smaller than that of the drum, and a friction lining therefor, said lining when mounted on said shoe having an outer surface of a radius of curvature substantially equal to the radius of curvature of the drum, and an inner surface of a radius of curvature substantially equal to the radius of curvature of the shoe, headed fasteners located only adjacent the ends of the lining and countersunk therein for securing said lining to said shoe, and adhesive means for fixedly securing a portion of the lining intermediate said ends to said shoe.

3. A brake shoe for cooperation with a brake drum, said shoe having a curved surface of a radius of curvature smaller than that of the drum, and a friction lining therefor, said lining when mounted on said shoe having an outer surface of a radius of curvature substantially equal to that of the drum, and an inner surface of a radius of curvature substantially equal to that of the shoe, headed fasteners located only adjacent the ends of the lining and countersunk therein for securing said lining to said shoe, and adhesive means fixedly securing a portion of the lining intermediate said ends to said shoe, the heads of said fasteners and a point within said lining intermediate the ends thereof and in the zone of minimum thickness of the lining defining an arc having a radius of curvature substantially equal to the radius of curvature of said drum.

4. A brake shoe for cooperation with a brake drum, a friction lining for said shoe and mounted thereon, said lining having a wearing surface layer and a relatively thin backing layer, each layer having a distinctly different color as contrasted to the color of the other layer, headed fasteners located only adjacent the ends of the lining and countersunk therein securing the lining to the shoe adjacent the ends thereof, and adhesive means fixedly securing the lining to the shoe intermediate the ends of the lining.

5. A brake shoe for cooperation with a brake drum, a resilient friction lining for said shoe and mounted thereon, said lining having a radius of curvature when unmounted which is greater than that of the shoe, headed fasteners located only adjacent the ends of the lining and countersunk therein securing the ends of the lining against the shoe, and adhesive means between the shoe and lining at a location intermediate the ends of the lining fixedly securing the liner to the shoe.

6. A brake shoe for cooperation with a brake drum, said shoe having a curved surface of a radius of curvature smaller than that of the drum and a friction lining mounted on said shoe, said lining having a wearing surface layer and a relatively thin backing layer, each layer having a distinctly different color as contrasted to the color of the other layer, the lining when mounted on the shoe having an outer surface of a radius of curvature substantially equal to that of the drum and an inner surface of a radius of curvature substantially equal to that of the shoe, headed fasteners located only adjacent the ends of the lining and countersunk therein for securing said lining to the shoe and adhesive means fixedly securing the lining to the shoe intermediate the ends of the lining, the heads of said fasteners and a point on the outer surface of said backing layer and intermediate said ends defining an arc having a radius of curvature substantially equal to the radius of curvature of the drum.

7. The method of assembling on a shoe a friction lining having shouldered apertures adjacent the ends thereof and an intermediate imperforate portion, the lining when unassembled having an inner radius of curvature greater than the outer radius of curvature of the shoe, said method comprising applying an adhesive between said intermediate portion of the lining and the shoe, bending the lining to conform to the shoe after said adhesive has been applied, and securing the ends of the lining against the shoe by headed fasteners extending through said apertures and into the shoe.

8. The method of assembling on a shoe a friction lining having shouldered apertures adjacent the ends thereof and an intermediate imperforate portion, the lining when unassembled having an inner radius greater than the outer radius of curvature of the shoe, said method comprising applying a heat-setting adhesive between said intermediate portion of the lining and the shoe, bending the lining to conform to the shoe after said adhesive has been applied, and securing the ends of the lining against the shoe by headed fasteners extending through said apertures and into the shoe.

JAMES R. GLAZEBROOK.
ALEXANDER T. WILLE.

References Cited in the file of this patent

UNITED STATES PATENTS

| Number | Name | Date |
| --- | --- | --- |
| 1,682,319 | Bluhm | Aug. 28, 1928 |
| 1,686,189 | Thompson | Oct. 2, 1928 |
| 1,891,723 | Novak | May 17, 1930 |
| 1,890,735 | Lake | Dec. 13, 1932 |
| 1,891,723 | Novak | Dec. 20, 1932 |
| 1,932,919 | Abert et al. | Oct. 31, 1933 |
| 2,080,314 | Hoof | May 11, 1937 |
| 2,087,453 | Steder | July 20, 1937 |
| 2,136,585 | Bruce | Nov. 15, 1938 |
| 2,218,680 | Kempel | Oct. 22, 1940 |
| 2,398,006 | Hunt | Apr. 9, 1946 |